US008718322B2

(12) United States Patent
Price et al.

(10) Patent No.: US 8,718,322 B2
(45) Date of Patent: May 6, 2014

(54) IMAGE RECOGNITION BASED UPON A BROADCAST SIGNATURE

(75) Inventors: Philip K. Price, Encinitas, CA (US); Ravinder P. Chandhok, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 402 days.

(21) Appl. No.: 12/891,926

(22) Filed: Sep. 28, 2010

(65) Prior Publication Data

US 2012/0076354 A1  Mar. 29, 2012

(51) Int. Cl.
*G06K 9/00* (2006.01)
(52) U.S. Cl.
USPC .......................... 382/103; 348/222.1
(58) Field of Classification Search
None
See application file for complete search history.

(56) References Cited

U.S. PATENT DOCUMENTS

| 8,225,370 | B2 * | 7/2012 | Ohata et al. | 725/139 |
| 2002/0045987 | A1 * | 4/2002 | Ohata et al. | 701/213 |
| 2002/0118183 | A1 * | 8/2002 | Inuzuka et al. | 345/204 |
| 2004/0258275 | A1 * | 12/2004 | Rhoads | 382/100 |
| 2005/0013462 | A1 * | 1/2005 | Rhoads | 382/100 |
| 2006/0251292 | A1 * | 11/2006 | Gokturk et al. | 382/103 |
| 2008/0089552 | A1 * | 4/2008 | Nakamura et al. | 382/100 |
| 2008/0196076 | A1 * | 8/2008 | Shatz et al. | 725/116 |
| 2009/0003731 | A1 * | 1/2009 | Nitta et al. | 382/298 |
| 2010/0066750 | A1 | 3/2010 | Yu et al. | |
| 2011/0181497 | A1 * | 7/2011 | Raviv | 345/8 |
| 2011/0187743 | A1 * | 8/2011 | Hwang et al. | 345/633 |
| 2012/0040612 | A1 * | 2/2012 | Lee et al. | 455/41.1 |
| 2012/0263154 | A1 * | 10/2012 | Blanchflower et al. | 370/338 |

FOREIGN PATENT DOCUMENTS

GB  2449694 A  * 12/2008

* cited by examiner

*Primary Examiner* — Tahmina Ansari
(74) *Attorney, Agent, or Firm* — Neugeboren O'Dowd PC

(57) ABSTRACT

Methods and apparatus for processing image data are disclosed. In one embodiment, a method includes capturing, via an image sensor, an image that includes a plurality of objects including a target object, and receiving, from the target object, via a medium other than the image sensor, distinguishing information that is broadcast by the target object. The distinguishing information distinguishes the target object from other objects, and is used to select, within the captured image, the target object from among the other objects.

28 Claims, 6 Drawing Sheets

IMAGE RECOGNITION BASED UPON A BROADCAST SIGNATURE

FIELD OF THE INVENTION

The present invention relates to computing devices. In particular, but not by way of limitation, the present invention relates to apparatus and methods for processing image data with computing devices.

BACKGROUND OF THE INVENTION

Devices utilizing visual interfaces (e.g., digital camera technology) to capture images of objects (e.g., living and nonliving) are now ubiquitous. And it is often desirable, for a variety of reasons, to differentiate between objects in captured images. In industrial applications, for example, it is often desirable for robotic equipment to select a particular object from among other objects so the particular object may be processed in some way.

As another example, in the context of devices providing users with augmented reality, it is often desirable for objects in an image to be differentiated from other objects so that a particular target object may be selected and the device display enhanced in a manner that is different from other objects in the image.

One technique that is utilized in existing systems to acquire a target object in captured images is to compare stored image data for a target object with the content of a captured image in an effort to differentiate the target object from other objects in the image. This type of comparison, however, is a complex and process-intensive task. In particular, target object differentiation in low contrast environments and/or cluttered environments (e.g., environments with many objects) is a particularly challenging task. And the difficulty of distinguishing between objects is increased even more when visually-similar objects are analyzed.

Accordingly, current object differentiation techniques are not always able to discriminate a target object from other objects, and will most certainly not be satisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In accordance with several embodiments, the invention may be characterized as a method for processing image data with an imaging device. The method includes capturing, via an image sensor, an image that includes a plurality of objects including a target object, and receiving, from the target object, via a medium other than the image sensor, distinguishing information that is broadcast by the target object. The broadcasted distinguishing information from the target object is used to select, within the captured image, the target object from among the other objects.

Another embodiment of the invention may be characterized as an imaging device that includes a visual interface configured to capture images of a plurality of objects including a target object and a receiver configured to receive signals that are broadcast from the target object. The signals from the target object include target information that indicates a visual aspect of the target object that is detectable within the captured images. The imaging device also includes an imaging system including a display, and the imaging system is configured to utilize the target information that is broadcast from the target object to differentiate the target object in the captured images from other objects.

Yet another embodiment of the invention may be characterized as a system for augmenting a presentation of a target object. The system in this embodiment includes a target object, which is configured to transmit differentiating information relating to an appearance of the target object that visually differentiates the target object from other objects. In addition, the system includes an imaging device, which includes a visual interface to capture images of the objects and the target object, a receiver to receive the differentiating information, and an imaging system to analyze, utilizing the differentiating information transmitted by the target object, the captured images so as to differentiate the target object within the captured images from the other objects in the captured image.

And another embodiment of the invention may be characterized as a non-transitory, tangible computer readable storage medium, encoded with processor readable instructions to perform a method for processing image data on an imaging device. The method includes capturing, via an image sensor, an image that includes a plurality of objects including a target object and receiving, from the target object, via a medium other than the image sensor, distinguishing information, which distinguishes the target object from other objects. In addition, the broadcasted distinguishing information is utilized to select, within the captured image, the target object from among the other objects.

And another embodiment of the invention may be characterized as the capability of the imaging device to command a target object to display a particular image, pattern or watermark, to aid target detection in cases where multiple similar target objects are present in the field of view of the imaging device.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
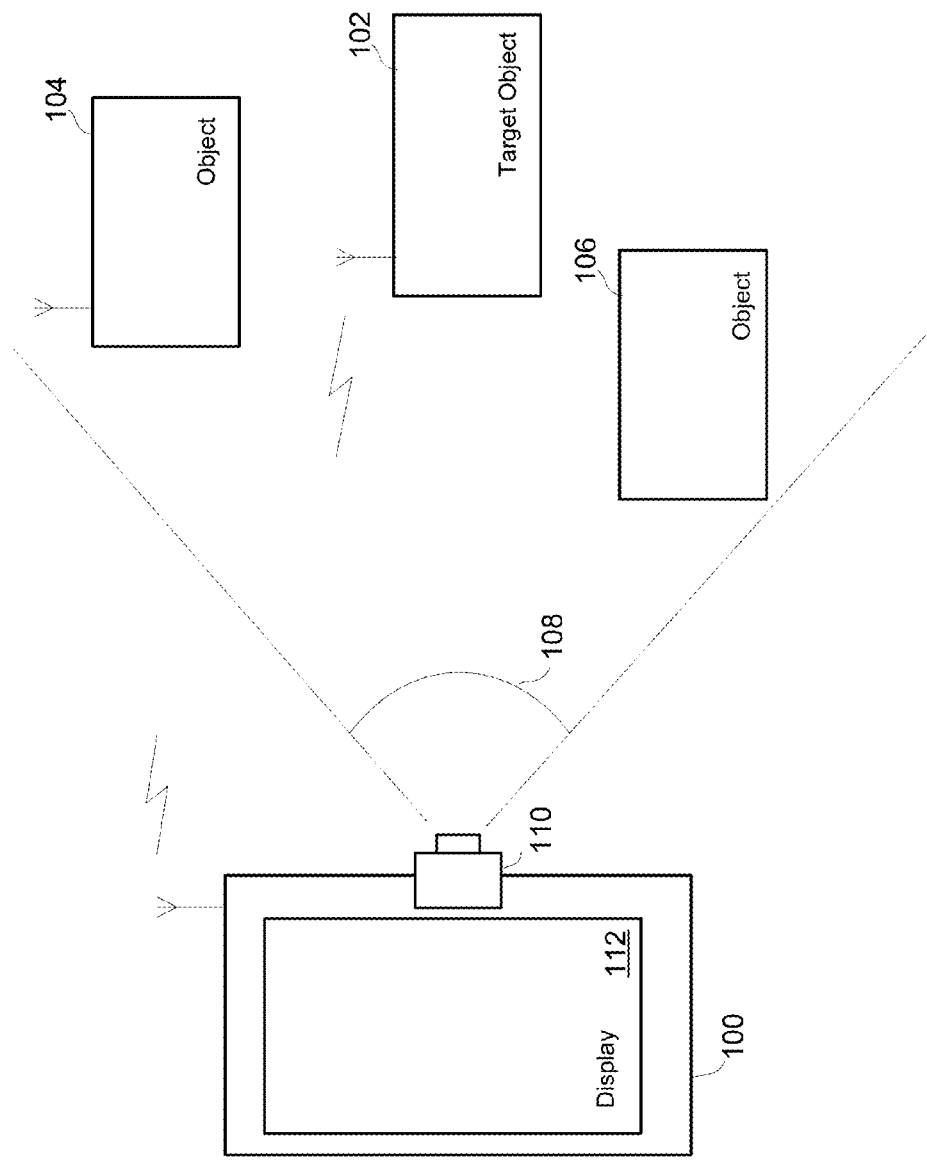
FIG. 1 is a diagram depicting an exemplary environment in which embodiments of the present invention may be utilized.

Referring first to FIG. 1, it is a diagram depicting an exemplary environment in which embodiments of the present invention may be utilized. As shown, the depicted environment includes an imaging device 100 along with a target object 102, a first object 104, and a second object 106, and all the objects 102, 104, 106 are positioned relative to the imaging device 100 to fall within a field of view 108 of a visual interface 110 of the imaging device 100. In addition, the imaging device 100 includes a display 112 that presents an image that is derived from a captured image of the objects 102, 104, 106.

In general, several embodiments of the present invention enable at least a portion of the target object 102 to be distinguished by the imaging device 100 from the other objects 104, 106 that are within the field of view 108 of the imaging device 100 using a signature that is broadcast by the target object 102. As discussed further herein, there are many advantages to being able to distinguish the target object 102 from other objects 104, 106 in a captured image, and the signature provides distinguishing information utilized by the imaging device 100 to acquire/select the target object from among other objects 104, 106.

The imaging device 100 may be embodied in a variety of devices including smartphones, netbooks, gaming devices, digital cameras, PDAs, laptop computers, desktop computers, and commercial/industrial devices. It should be recognized that the components of the imaging device 100 may be distributed about different locations and need not be integrated within a single, unitary housing. For example, the visual interface 110 may be implemented in one location that is separate from the display 112, and many of the underlying processing components (discussed further herein) may be implemented in yet another location that is separate from both the display 112 and the visual interface 110.

The target object 102 may be any object that is capable of communicating, to the imaging device 100, distinguishing information about its appearance by wired, wireless communication, or a combination of wired and wireless communication. As discussed further herein, the distinguishing information may be a variety of different types of information related to aspects of the appearance of the target object 102 that distinguishes the target object 102 from other objects 104, 106.

Although the target object 102 is depicted as a single object for simplicity, the target object 102 may include separable components that are closely-tied together. For example, the target object 102 may include both a smartphone and a user operating the smart phone, and the smartphone may transmit distinguishing information about the appearance of the user to the imaging device 100. As another example, the target object 102 may be a geographical feature (e.g., man-made or naturally occurring) that is coupled to transmitter components that transmit distinguishing information relative to the geographical feature.

As previously discussed, distinguishing a target object (e.g., target 102) in an image from among other objects (e.g., objects 104, 106) in the image is often a difficult task that is further complicated when the objects have a similar appearance, when contrast is low, and/or when there are many objects. Beneficially, the distinguishing information that is broadcast by the target object 102, according to many embodiments of the invention, enables detection of the target object 102 that could not be done before, and/or enables faster and less complex acquisition of the target object 102.

In some embodiments, the broadcasted distinguishing information from the target object 202 includes values of parameters that define geometric aspects of the target object 102. For example, if the target object 102 includes a person holding a smartphone, the smartphone may transmit values of facial-defining-parameters that distinguish the face of the person from other objects (e.g., the faces of other persons) that are within the image captured by the imaging device 100. As another example, if the target object 102 is a particular building that is positioned among other buildings (other objects), the particular building may transmit distinguishing information that describes physical attributes of the building. For example, the distinguishing information may include a height to width ratio of the building and/or a color of the building.

In other embodiments, the distinguishing information that is broadcast by the target object 102 includes information that includes a representation of an image of the target object 102. The representation of the image may be a complete image of the target object 102 (e.g., a JPEG of the target object 102), which the imaging device compares to the captured image, or a reduced form of an image of the target object 102.

Figure 2:
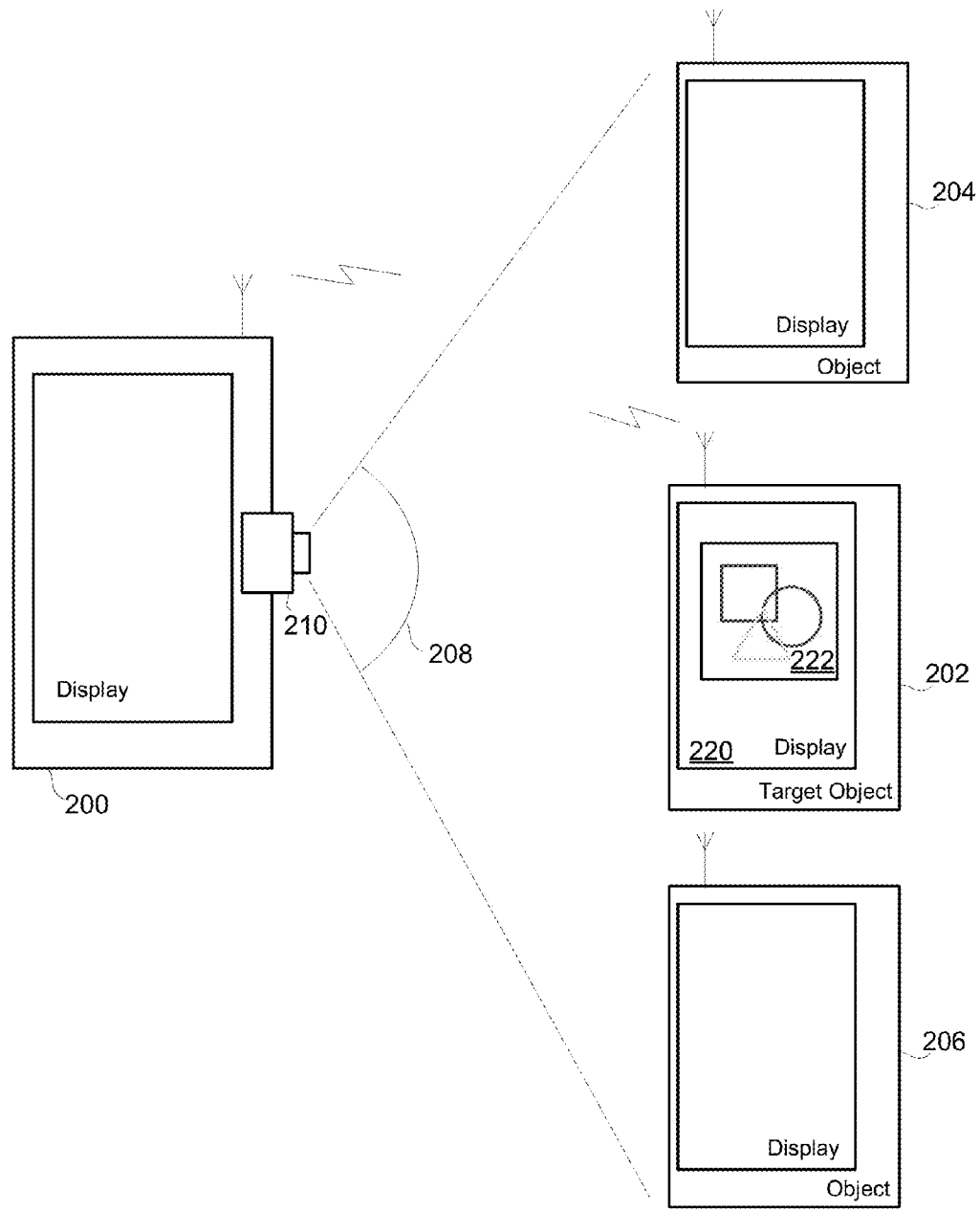
FIG. 2 is another diagram depicting a system in which a target object includes a display for displaying distinguishing information.

Referring next to FIG. 2, shown is a diagram depicting a system in which a target object 202 includes a display 220 for displaying visually distinguishing information (e.g., content that visually distinguishes an appearance of the target object 202 from other objects 204, 206). As shown, the target object 202 in this embodiment presents an image 222 on the display 220 that distinguishes the target object 202 from other objects 204, 206 within a field of view 208 of an imaging device 200. And in addition, in many variations of the embodiment depicted in FIG. 2, the distinguishing information that is broadcast by the target object 202 includes a reduced form of the image 222 that is presented by the target object 202. As a consequence, the processing load associated with comparing the distinguishing information (broadcast by the target object 202) with the image that is captured (by the visual interface 210) is substantially reduced.

For example, the reduced form of the image 222 that is broadcast to the imaging device 200 may include a subset of the image 222, which the imaging device 200 utilizes to distinguish the target object 202 from the other objects 204, 206. And the subset of the image 222 may be, by way of further example, one or more of the corners or other portions of the image 222, or a pattern in an identified area of the image 222 (e.g., the corners, the center, or a fixed ratio of the width or height).

The reduced form of the image (that is broadcast by the target object 202) may also include a representation of a digital watermark that is displayed by the target object 202 within the image 222. In these implementations, the digital watermark visually distinguishes the target object 202 from the other objects 204, 206, and the imaging device 200 is able to locate the digital watermark in the captured image, and as a consequence, the imaging device 200 is able to differentiate the target object 202 from the other objects 204, 206.

Although the digital watermark presented in the image 222 may not be perceptible to humans viewing the image 222, one of ordinary skill in the art will appreciate that the digital watermark visually distinguishes the target object 202 from the other objects 204, 206 because the imaging device 200 may be configured to detect the digital watermark in the image 222 (that is not detectable by humans) and compare the broadcasted representation of the watermark with the visual presentation of the watermark in the image 222.

Figure 3:
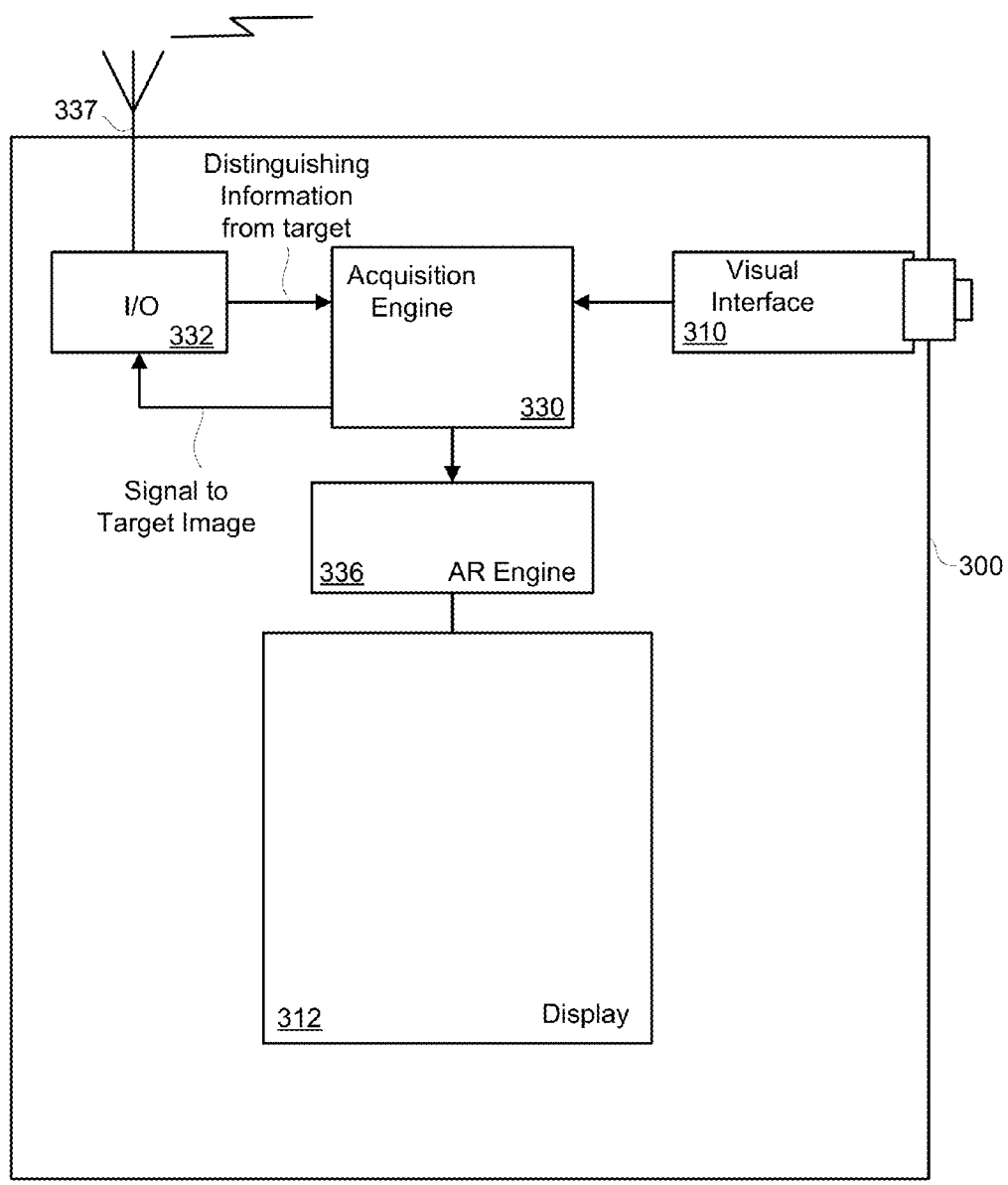
FIG. 3 is a block diagram depicting the functional components of an exemplary mobile device according to an embodiment of the invention.

Referring next to FIG. 3, shown is a block diagram depicting the functional components of an exemplary imaging device 300 according to an embodiment of the invention. As shown, the imaging device 300 includes an acquisition engine 330 that is coupled to an I/O portion 332, a visual interface 310, and an augmented reality (AR) engine 336. In addition, the I/O portion 332 is coupled to an antenna 337 and the AR engine 336 is coupled to a display 312.

The illustrated arrangement of these components is logical, the connections between the various components are exemplary only, and the depiction of this embodiment is not meant to be an actual hardware diagram; thus one of ordinary skill in the art will readily appreciate that the components can be combined or further separated and sub-divided in an actual implementation, and the components can be connected in a variety of ways without changing the basic operation of the system. Moreover, components may be removed and/or supplemented so that more or less components can be utilized in any particular implementation.

For example, the acquisition engine 330 and AR engine 336 may be integrated to such an extent that it is difficult to identify separable components or modules. And in addition, one of ordinary skill in the art will appreciate that the I/O component 332 and visual interface 310 depicted in FIG. 3 will include several constituent components, which may vary, when realized in the embodiments discussed further herein.

The I/O component 332 generally operates to receive and process communications from target objects (e.g., target objects 102, 202) to extract the distinguishing information from the communicated signals so that the distinguishing information is in a form that may be analyzed by the acquisition engine 330. In many embodiments, the I/O component 332 is configured to wirelessly communicate with target objects according to one or more wireless communication schemes (e.g., Bluetooth and/or WiFi). One of ordinary skill in the art will appreciate that the I/O component 332 in these embodiments may include wireless transceiver components, and components (e.g., realized by hardware, software, and/or firmware) associated with down converting and extracting the distinguishing information that is received from target objects via the antenna 337.

In other embodiments, the I/O component 332 receives distinguishing information from a target object via a wired communication link (e.g., RS-232, USB, IEEE 1394), and in these embodiments, the I/O component 332 includes the hardware and processing components to extract the distinguishing information from the signals received by the wireline communication. The above-identified wireless and wireline communication schemes are only exemplary, and it is certainly contemplated that other existing or yet-to-be-developed technologies and protocols may be utilized to enable a target object to communicate distinguishing target information to the imaging device 300 by a medium other than the visual interface.

In general, the visual interface 310 functions to capture and provide digital representations of images of objects within its field of view to the acquisition engine 330. For example, the visual interface 310 may capture and provide still images and/or video images in a variety of formats to the acquisition engine 300. For clarity, the potential constituent hardware, software, and/or firmware components of the visual interface 310 are not depicted, but one of ordinary skill in the art will readily appreciate in light of this disclosure that the visual interface 310 may be realized by a variety of distributed and/or integrated components. For example, these components may include optical components, sensors (e.g., CCD or CMOS image sensors), associated power hardware and controls, processing logic (e.g., implemented with software, firmware, and/or hardware), and memory.

The acquisition engine 330 is configured to analyze distinguishing information received from a target object (e.g., target object 102, 202) via the I/O component 332 in connection with the digital representation of the captured images (provided by processing components of the visual interface). More specifically, the acquisition engine 330 utilizes the distinguishing information to distinguish a target object from among other objects in the captured image(s). As discussed above, the distinguishing information may take a variety of forms, and as a consequence, the implementation of the acquisition engine 330 may vary to accommodate different types of distinguishing information and different types of data formatting.

Although not required, in many implementations (including the embodiment depicted in FIG. 3.) the acquisition engine 330 also operates to bi-directionally communicate with target objects. Communicating information to the target object is useful for many purposes including prompting the target object to display a particular image to enable the acquisition engine 330 to more readily detect the target object in a captured image. For example, the acquisition engine may initially request (by transmitting a request to the target object) that the target object display a particular type of image. Or if the acquisition engine 330 is having difficulty acquiring the target object, the acquisition engine 300 may request that the target object alter at least a portion of the image it is presenting on its display so as to facilitate the imaging device 300 distinguishing the target object from other objects.

By way of further example, it is also contemplated that the imaging device 300 and target objects may engage in an initial dialog to establish communications, and then the imaging device 300 may request a particular image (e.g., a complete image, reduced image, watermark, or defined pattern) be displayed. In this way, if a target object is visually similar or identical to other objects, the target object may present a particular image on its display to distinguish its appearance from other objects.

Although it is certainly contemplated that target acquisition may be utilized for other purposes in connection with other applications, the embodiment in FIG. 3 includes the AR engine 336 which generally operates to augment the images captured by the visual interface 310 utilizing input received from the acquisition engine 330. For example, once a target object has been detected in a captured image, the target object within the captured image(s) may be enhanced in a variety of ways when presented to a user on the display 312.

The display 312 is generally configured to display images to the user that are derived from the images captured by the visual interface 310. The display 312 may be realized by LCD or OLED technologies, but these are only exemplary and other types of display technologies may certainly be utilized.

Figure 4:
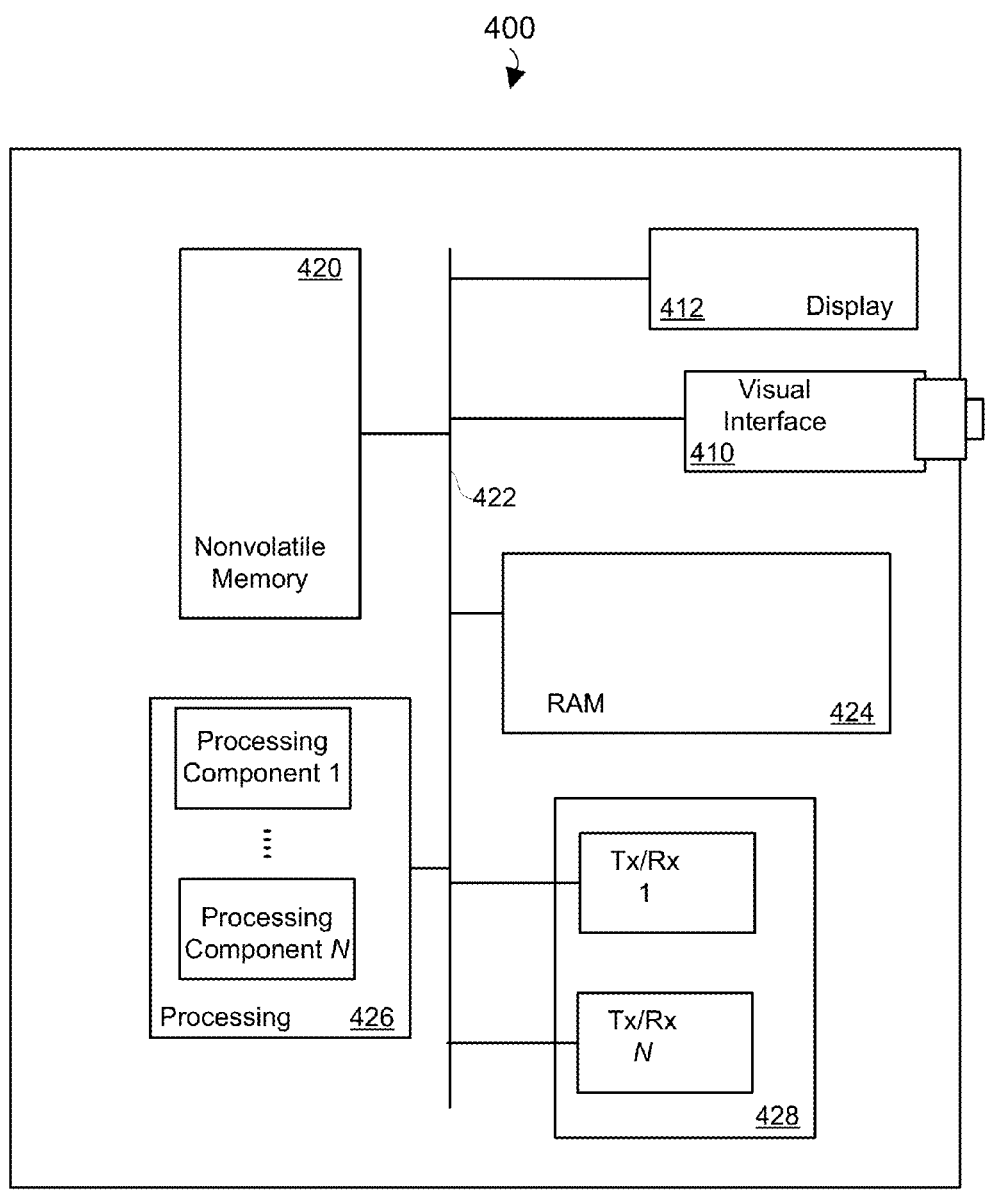
FIG. 4 is a block diagram depicting physical components that may be used to realize the functional components depicted in FIG. 3.

Referring next to FIG. 4, shown is a block diagram depicting physical components of an exemplary embodiment of an imaging device 400. As shown, a visual interface 410, display portion 412, and nonvolatile memory 420 are coupled to a bus 422 that is also coupled to random access memory ("RAM") 424, a processing portion (which includes N processing components) 426, and a transceiver component 428. Although the components depicted in FIG. 4 represent physical components of an imaging device (e.g., imaging device 100, 200, 300) it is not intended to be a hardware diagram; thus many of the components depicted in FIG. 4 may be realized by common constructs or distributed among additional physical components. Moreover, it is certainly contemplated that other existing and yet-to-be developed physical components and architectures may be utilized to implement the functional components described with reference to FIG. 3.

In general, the nonvolatile memory 420 functions to store (e.g., persistently store) data and executable code including code that is associated with the functional components depicted in FIG. 3. In some embodiments for example, the nonvolatile memory 420 includes bootloader code, modem software, operating system code, file system code, and code to facilitate the implementation of one or more portions of the visual interface 310, the acquisition engine 330, the I/O portion 332, the AR engine 336 and operations of the display 312.

In many implementations, the nonvolatile memory 420 is realized by flash memory (e.g., NAND or ONENAND™ memory), but it is certainly contemplated that other memory types may be utilized as well. Although it may be possible to execute the code from the nonvolatile memory 420, the executable code in the nonvolatile memory 420 is typically loaded into RAM 424 and executed by one or more of the N processing components in the processing portion 110.

The visual interface 410 in the embodiment depicted in FIG. 4 may be realized by a variety of distributed and/or integrated components including optical components, sensors (e.g., CCD or CMOS), A/D components and digital processing components to render digital representations of images to the previously described acquisition engine 330.

The N processing components 426 in connection with RAM 424 generally operate to execute the instructions stored in nonvolatile memory 420 to effectuate the functional components depicted in FIG. 3. As one of ordinarily skill in the art will appreciate, the processing components 426 may include a video processor, modem processor, DSP, graphics processing unit (GPU), and other processing components.

The depicted transceiver component 428 includes N transceiver chains, which may be used in connection with realizing the I/O portion 332, for communicating with external devices, including a target object. Each of the N transceiver chains represents a transceiver associated with a particular communication scheme. For example, one transceiver chain may operate according to wireline protocols, another transceiver may communicate according to WiFi communication protocols (e.g., 802.11 protocols), another may communicate according to cellular protocols (e.g., CDMA or GSM protocols), and yet another may operate according to Bluetooth protocols. Although the N transceivers are depicted as a transceiver component 428 for simplicity, it is certainly contemplated that the transceiver chains may be separately disposed about the imaging device 400.

This display 412 generally operates to provide visual images to a user including images that include the target object. Although not depicted for clarity, one of ordinary skill in the art will appreciate that other components including a display driver and backlighting (depending upon the technology of the display) are also associated with the display 412.

Figure 5:
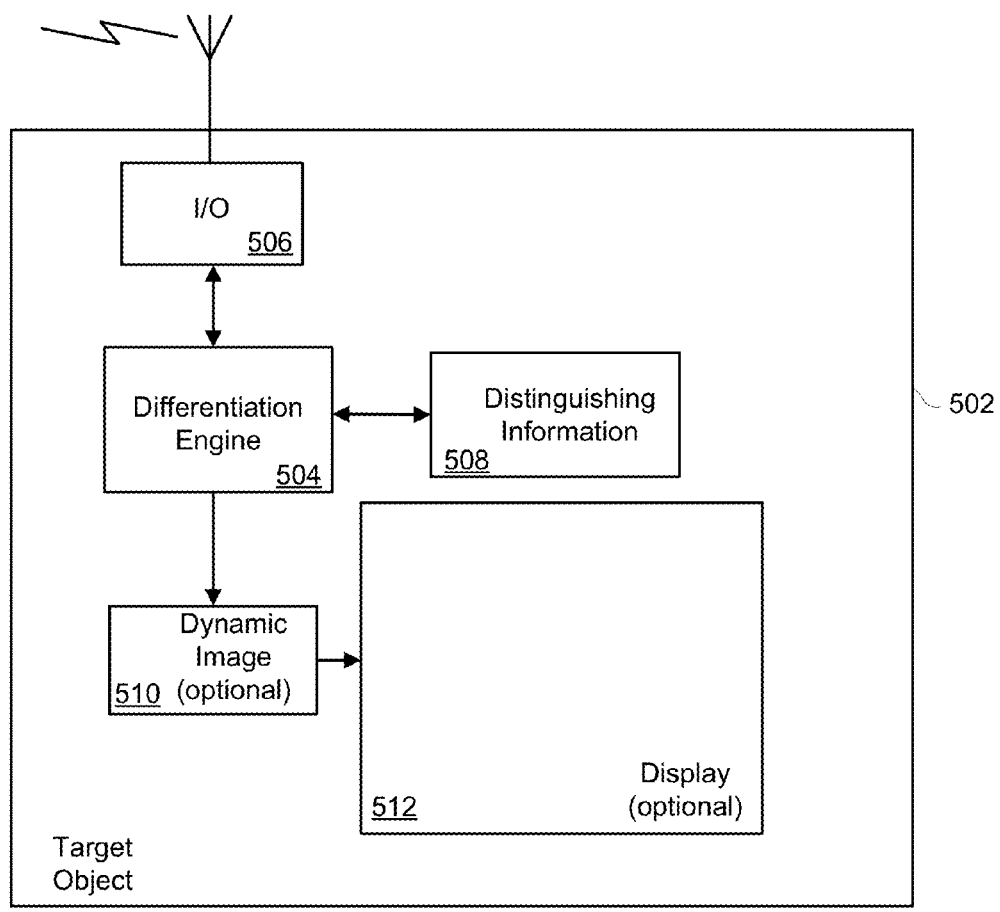
FIG. 5 is a block diagram depicting functional components of an exemplary target object.

Referring next to FIG. 5, it is a block diagram depicting functional components of an exemplary target object 502. As shown, the target object 502 in this embodiment includes a differentiation engine 504 that is coupled to an I/O portion 506, distinguishing information component 508 and a dynamic image portion 510, which is coupled to an optional display 512. It should be recognized that the depicted arrangement of these components is logical, the connections between the various components are exemplary only, and the depiction of this embodiment is not meant to be an actual hardware diagram; thus one of ordinary skill in the art will readily appreciate that the functions corresponding to the depicted components can be combined or further separated and sub-divided in an actual implementation, and the components can be connected in a variety of ways without changing the basic operation of the system.

In general, the differentiation engine 504 operates to help distinguish the target object 502 from other objects that may have a similar appearance to the target object 502. More specifically, the differentiation engine 504 in this embodiment coordinates the operation of the dynamic image portion 510 and transmission, via the I/O portion 506, of distinguishing target information to an imaging device (e.g., imaging device 100, 200, 300, 400).

The distinguishing information component 508 provides distinguishing information to the differentiation engine 504, which the differentiation engine 504, in connection with the I/O portion 506, communicates to an imaging device in a format that the imaging device is capable of utilizing. The distinguishing information component 508 may be realized, at least in part, by memory (e.g., nonvolatile and/or RAM) that stores predefined distinguishing information and/or distinguishing information that is dynamically generated responsive to information from an imaging device.

For example, the predefined distinguishing information may include values of parameters that define geometric aspects of the target object 502 (e.g., geometrical aspects of the target object 502 and/or a user operating the target object 502), a reduced form of an image depicting an appearance of the target object 502, or a complete image of the target object 502.

And in some embodiments, the predefined distinguishing information may be a representation of content (e.g., a digital watermark or an image) presented on the display 512 of the target object 502. For example, the distinguishing information component may include data that defines multiple forms of displayable content that may be selected and displayed on the display 512, and the differentiation engine 504, in connection with the I/O portion 506, communicates a representation of the displayed content, which an imaging device may interpret and use to detect the target object from among other objects in a captured image.

In addition, an imaging device may have an awareness of predefined displayable content that the target device 502 is capable of displaying and may direct the target device 502 to display particular content (e.g., watermarks or other distinguishing content).

In other words, the predefined distinguishing information may include information indicative of a user or other constructs that are closely coupled to the target object, geometrical attributes of the target object, and/or an appearance of the target object that may include (and may be limited to) content presented on the display 512.

In addition, the distinguishing information in other implementations may be dynamic distinguishing information, which is defined by an imaging device. For example, the dynamic distinguishing information may be content that is transmitted to the target object 502 by the imaging device, or the imaging device may direct the target object 502 to obtain content from a remote source (e.g., via the Internet). Moreover, an operator may provide content to the target device 502.

One of ordinary skill will appreciate that the underlying physical components that may be utilized to realize the functional components of the target object 502 may be the same physical components described with reference to FIG. 4; thus a description of those physical components is not repeated in connection with FIG. 5.

Figure 6:
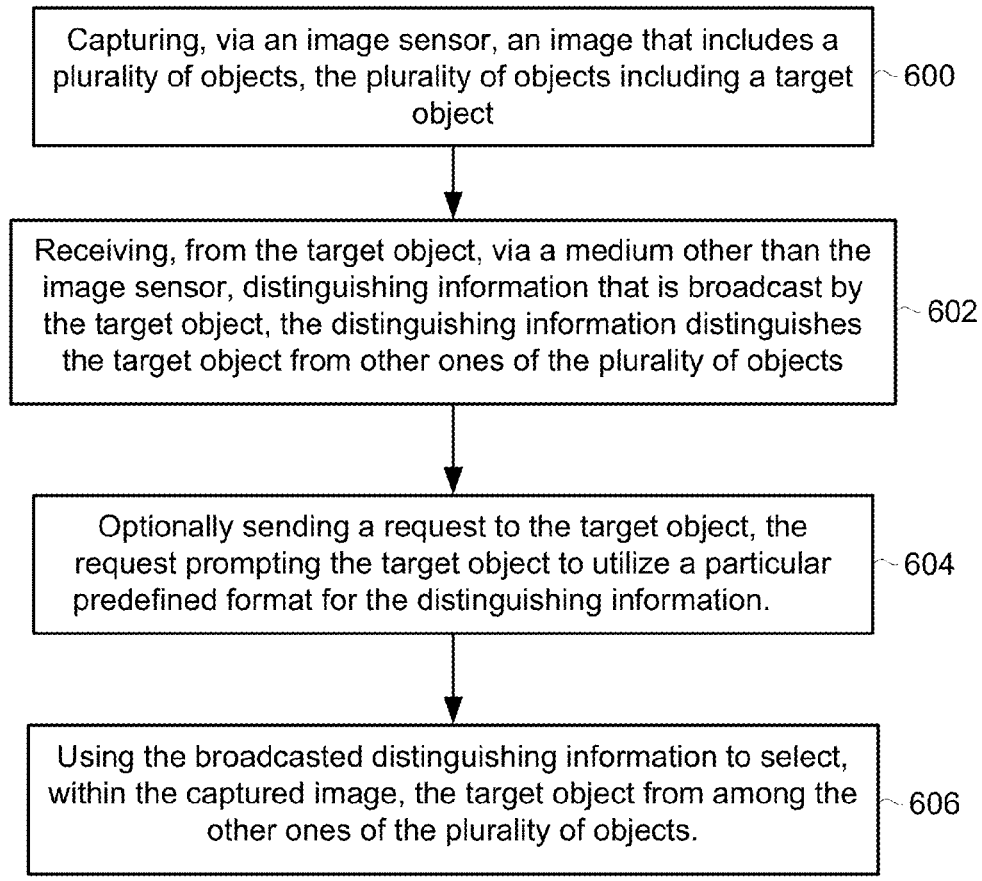
FIG. 6 is a flowchart that depicts a method that may be carried out in connection with the embodiments described with reference to FIGS. 1-5.

Referring next to FIG. 6, it is a flowchart that depicts a method that may be carried out in connection with the embodiments described with reference to FIGS. 1-5. As depicted, an image that includes a target object along with other objects is initially captured via an image sensor (Block 600). As discussed previously, the image may be captured by a variety of types of imaging devices (e.g., smartphones, netbooks, gaming devices, digital cameras, PDAs, laptop computers, desktop computers, and commercial/industrial devices) that include an image sensor, and the image sensor may be any sensor such as, but not limited to, CCD or CMOS-based sensors that capture an image (e.g., via an optical visual interface).

In addition, distinguishing information, which distinguishes the target object from the other objects, is received from the target object via a medium other than the image sensor (Block 602). For example, the distinguishing information may be any information about the appearance of a target object that is captured in an image of the target object, which distinguishes the target object from other objects that are captured in the image. And the medium by which the distinguishing information is conveyed may be virtually any wired or wireless communication medium that enables an imaging device to communicate with a target object (e.g., in a unidirectional or bidirectional manner).

As depicted in FIG. 6, a request is optionally sent to the target object that prompts the target object to utilize a particular format for the distinguishing information (Block 604). As previously discussed, in some embodiments, an imaging device and one or more target objects are capable of communicating so that the imaging device may prompt a particular format for the distinguishing information. For example, in some variations the imaging device may request that the distinguishing information take the format of values of geometrical parameters of the target object. In other variations where the target device includes a display, the imaging device may request that the target object display particular information (e.g., a digital watermark) on its display.

After the distinguishing information is received from the target object, the distinguishing information is utilized to select, within the captured image, the target object from among the other objects in the captured image (Block 606). The selection of the target object may be carried out in connection with a variety of applications. In the context of augmented reality for example, the acquired target object may enhanced in a variety of ways to augment the content of the captured target image. It is also contemplated that a variety of commercial/industrial applications may utilize the systems and methods described herein to identify a target object from among many objects to process the target object in a variety of ways.

In conclusion, embodiments of the present invention enable an imaging device to acquire, within captured images, a target object from among other objects using information that is broadcast by the target object. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for processing image data on a mobile device, the method comprising: capturing, via an optical image sensor on the mobile device, a visual image that includes a plurality of objects simultaneously residing within a field of view of the optical image sensor, the plurality of objects including a target object; receiving, via a receiver on the mobile device, from the target object, via a medium other than the optical image sensor, distinguishing information about the appearance of the target object that is independent of a location of the target object and is broadcast by the target object, the distinguishing information distinguishes the target object from other ones of the plurality of objects that simultaneously exist with the target object within the captured visual image; using the distinguishing information to select, within the captured visual image, the target object from among the other ones of the plurality of objects that simultaneously exist with the target object in the captured visual image; sending, from the mobile device, when the target object cannot be selected from among the other ones of the plurality of objects within the captured visual image, a request to the target object that requests the target object to alter the distinguishing information; receiving, via the receiver on the mobile device, from the target object, via the medium other than the image sensor, the altered distinguishing information; and using the altered distinguishing information to select the target object from among the other ones of the plurality of objects.

2. The method of claim 1, wherein the distinguishing information includes a reduced form of a visual image of the target object.

3. The method of claim 2, wherein the reduced form of the visual image includes a broadcast representation of a digital watermark that is displayed by the target object, the method including:
   detecting the digital watermark in the captured image; and
   comparing the detected digital watermark in the captured image with the broadcast representation of the digital watermark that is included in the broadcast distinguishing information from the target object.

4. The method of claim 2, wherein the reduced form of the visual image includes a subset of the visual image of the target object, the method including:
   detecting the subset of the visual image of the target object in the captured image.

5. The method of claim 4, wherein the subset of the image of the target object is presented in a pattern.

6. The method of claim 1, wherein the distinguishing information includes values of parameters that define non-variable geometric aspects of the target object.

7. The method of claim 6, wherein the parameters include facial-defining-parameters that distinguish a face of a person from the other ones of the plurality of objects.

8. A mobile device, comprising:
   a visual interface configured to capture visual images of a plurality of objects that simultaneously reside within a field of view of the visual interface, the plurality of objects including a target object;
   a receiver configured to receive signals that are broadcast from the target object, the signals including target information that indicates a visual aspect of the target object, which is independent of a location of the target object, the visual aspect of the target object being detectable within the captured images; and
   an imaging system including a display and an acquisition engine, the acquisition engine is configured to:
      utilize the target information that is broadcast from the target object to differentiate the target object in the captured images from others of the plurality of objects that simultaneously exist in each of the captured images with the target object; and generate, if the target object cannot be differentiated from others of the plurality of objects, a request that the target object alter the visual aspect of the target object; and
a transmitter to transmit the request to the target object.

9. The mobile device of claim 8, wherein the receiver is a wireless receiver.

10. The mobile device of claim 8, wherein the receiver is a wired receiver.

11. The mobile device of claim 8, including:
a transmitter configured to transmit a request to a target object to display a different pattern.

12. A system for augmenting a presentation of a target object, the system including: a target object, the target object is configured to transmit differentiating information that includes values for parameters that characterize non-variable physical attributes of the target object itself that are independent of a location of the target object, relating to a visual aspect of the target object that visually differentiates the target object from other objects; and a mobile device, the mobile device including a visual interface to capture images of the target object and the other objects that simultaneously reside with the target object within a field of view of the visual interface, a receiver to receive the differentiating information, and an imaging system to analyze the values for parameters that characterize non-variable physical attributes of the target object itself that are transmitted by the target object to differentiate the target object from others of the plurality of objects that simultaneously exist with the target object in the captured images, and an acquisition engine to request that the target object alter the visual aspect of the target object if the target object cannot be differentiated from others of the plurality of objects.

13. The system of claim 12, wherein the parameters include facial-defining-parameters that distinguish a face of a person from the other objects.

14. The system of claim 13, wherein the mobile device and the target object are configured to bi-directionally communicate.

15. A mobile apparatus, comprising: means for capturing, via an optical image sensor, a visual image that includes a plurality of objects simultaneously residing within a field of view of the optical image sensor; means for receiving, from the target object, via a medium other than the optical image sensor, distinguishing information about the appearance of the target object that is independent of a location of the target object and is broadcast by the target object, the distinguishing information distinguishes the target object from other ones of the plurality of objects that simultaneously exist with the target object within the captured visual image; and means for using the distinguishing information to select, within the captured image, the target object from among the other ones of the plurality of objects that simultaneously exist with the target object in the captured visual image; means for sending, when the target object cannot be selected from among the other ones of the plurality of objects within the captured image, a request to the target object that requests the target object to alter the distinguishing information; means for receiving, from the target object, via a medium other than the image sensor, the altered distinguishing information; and means for using the altered distinguishing information to select, within the captured image, the target object from among the other ones of the plurality of objects.

16. The apparatus of claim 15, wherein the distinguishing information includes a reduced form of a visual image of the target object.

17. The apparatus of claim 16, wherein the reduced form of the visual image includes a broadcast representation of a digital watermark that is displayed by the target object, the apparatus including:
means for detecting the digital watermark in the captured image; and
means for comparing the detected digital watermark in the captured image with the broadcast representation of the digital watermark that is included in the broadcast distinguishing information from the target object.

18. The apparatus of claim 17, wherein the reduced form of the visual image includes a subset of the visual image of the target object, the apparatus including:
means for detecting the subset of the visual image of the target object in the captured image.

19. The apparatus of claim 18, wherein the subset of the image of the target object is presented in a pattern.

20. The apparatus of claim 15, wherein the distinguishing information includes values of parameters that define non-variable geometric aspects of the target object.

21. The apparatus of claim 20, wherein the parameters include facial-defining-parameters that distinguish a face of a person from the other ones of the plurality of objects.

22. A non-transitory, tangible computer readable storage medium, encoded with processor readable instructions to perform a method for processing image data on a mobile device, the method comprising: capturing, via an optical image sensor on the mobile device, a visual image that includes a plurality of objects simultaneously residing within a field of view of the optical image sensor, the plurality of objects including a target object; receiving, via a receiver on the mobile device, from the target object, via a medium other than the optical image sensor, distinguishing information about the appearance of the target object that is independent of a location of the target object and is broadcast by the target object, the distinguishing information distinguishes the target object from other ones of the plurality of objects that simultaneously exist with the target object within the captured visual image; using the distinguishing information to select, within the captured visual image, the target object from among the other ones of the plurality of objects that simultaneously exist with the target object in the captured visual image; sending, from the mobile device, when the target object cannot be selected from among the other ones of the plurality of objects within the captured visual image, a request to the target object that requests the target object to alter the distinguishing information; receiving, via the receiver on the mobile device, from the target object, via the medium other than the image sensor, the altered distinguishing information; and using the altered distinguishing information to select the target object from among the other ones of the plurality of objects.

23. The non-transitory, tangible computer readable storage medium of claim 22, wherein the distinguishing information includes a reduced form of a visual image of the target object.

24. The non-transitory, tangible computer readable storage medium of claim 23, wherein the reduced form of the visual image includes a broadcast representation of a digital watermark that is displayed by the target object, the method including:
detecting the digital watermark in the captured image; and
comparing the detected digital watermark in the captured image with the broadcast representation of the digital watermark that is included in the broadcast distinguishing information from the target object.

25. The non-transitory, tangible computer readable storage medium of claim 23, wherein the reduced form of the visual image includes a subset of the visual image of the target object, the non-transitory, tangible computer readable storage medium encoded with processor readable instructions to:
   detect the subset of the visual image of the target object in the captured image.

26. The non-transitory, tangible computer readable storage medium of claim 25, wherein the subset of the image of the target object is presented in a pattern.

27. The non-transitory, tangible computer readable storage medium of claim 22, wherein the distinguishing information includes values of parameters that define non-variable geometric aspects of the target object.

28. The non-transitory, tangible computer readable storage medium of claim 27, wherein the parameters include facial-defining-parameters that distinguish a face of a person from the other ones of the plurality of objects.

* * * * *